US006586948B1

(12) United States Patent
Aoki et al.

(10) Patent No.: US 6,586,948 B1
(45) Date of Patent: Jul. 1, 2003

(54) VEHICLE SEAT WEIGHT MEASURING DEVICE

(75) Inventors: Hiroshi Aoki, Tokyo (JP); Shuji Kusaka, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/627,420

(22) Filed: Jul. 27, 2000

(30) Foreign Application Priority Data

Jul. 27, 1999 (JP) .......................................... 11-212212

(51) Int. Cl.⁷ ........................ G01R 27/26; G01G 19/52; B06R 21/32
(52) U.S. Cl. ........................ 324/662; 280/735; 177/144
(58) Field of Search ................................ 324/662, 686, 324/672, 679; 280/735; 340/667; 177/144, 211

(56) References Cited

U.S. PATENT DOCUMENTS

| 4,005,845 A | * | 2/1977 | Luppi et al. ................. 248/419 |
| 5,924,641 A | * | 7/1999 | Keller et al. ............. 242/379.1 |
| 5,988,676 A | * | 11/1999 | Lotiti et al. ................. 280/735 |
| 6,040,532 A | * | 3/2000 | Munch ........................ 177/144 |
| 6,069,325 A | | 5/2000 | Aoki ........................... 177/136 |
| 6,092,838 A | * | 7/2000 | Walker ....................... 280/735 |
| 6,231,076 B1 | * | 5/2001 | Blakesley et al. .......... 280/735 |
| 6,244,116 B1 | * | 6/2001 | Osmer et al. .......... 73/862.474 |
| 6,293,585 B1 | * | 9/2001 | Bruns et al. ................. 280/735 |
| 6,342,683 B1 | * | 1/2002 | Aoki et al. ................. 177/144 |
| 6,356,200 B1 | * | 3/2002 | Hamada et al. ............. 340/667 |
| 6,407,347 B1 | * | 6/2002 | Blakesley ................... 177/144 |

FOREIGN PATENT DOCUMENTS

| GB | 2 340 252 A | 2/2000 | ..................... 19/12 |
| JP | 11-001153 | 1/1999 | ..................... 21/32 |
| JP | 11-304579 | 11/1999 | ..................... 19/52 |

* cited by examiner

Primary Examiner—Kamand Cuneo
Assistant Examiner—Jimmy Nguyen
(74) Attorney, Agent, or Firm—Foley & Lardner

(57) ABSTRACT

A device is provided for measuring the weight of a vehicle seat and the weight of a person sitting on the vehicle seat. The device is equipped with a load sensor for converting at least a part of the seat weight to an electric signal, and a deviation/deflection absorbing mechanism which has a pin bracket and a pin and is provided between the seat and the load sensor. The deviation amount that can be absorbed by this absorbing mechanism is a fixed value.

10 Claims, 7 Drawing Sheets

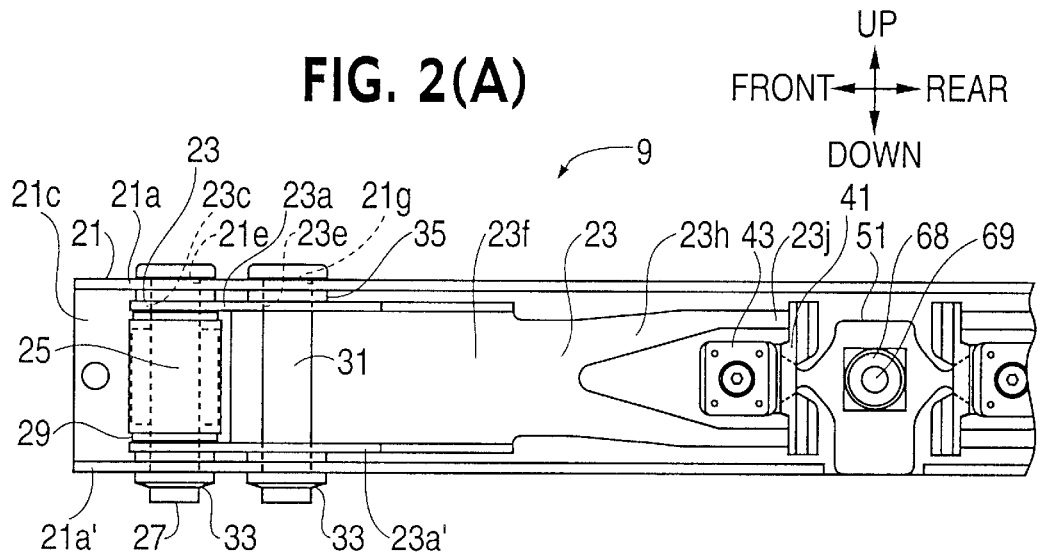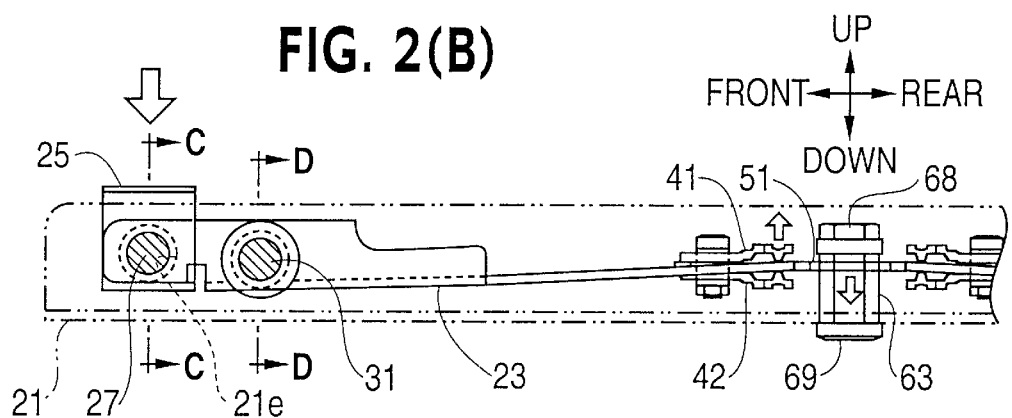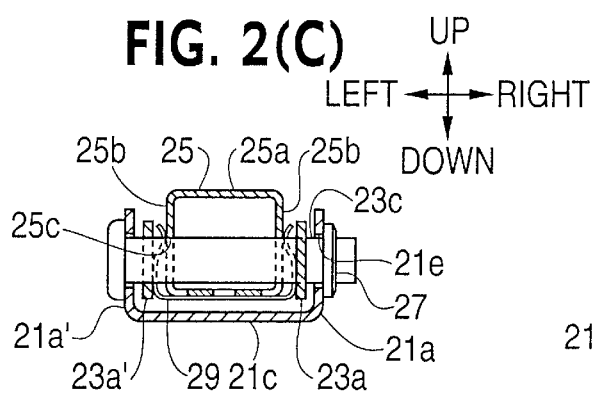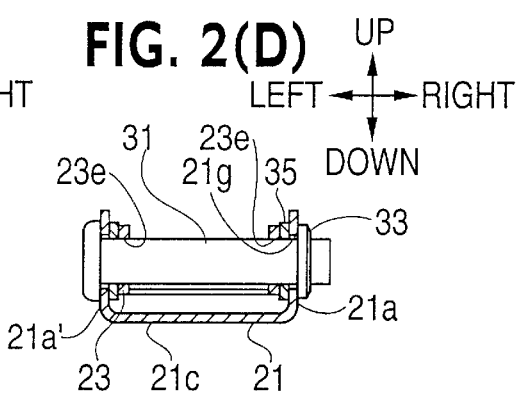

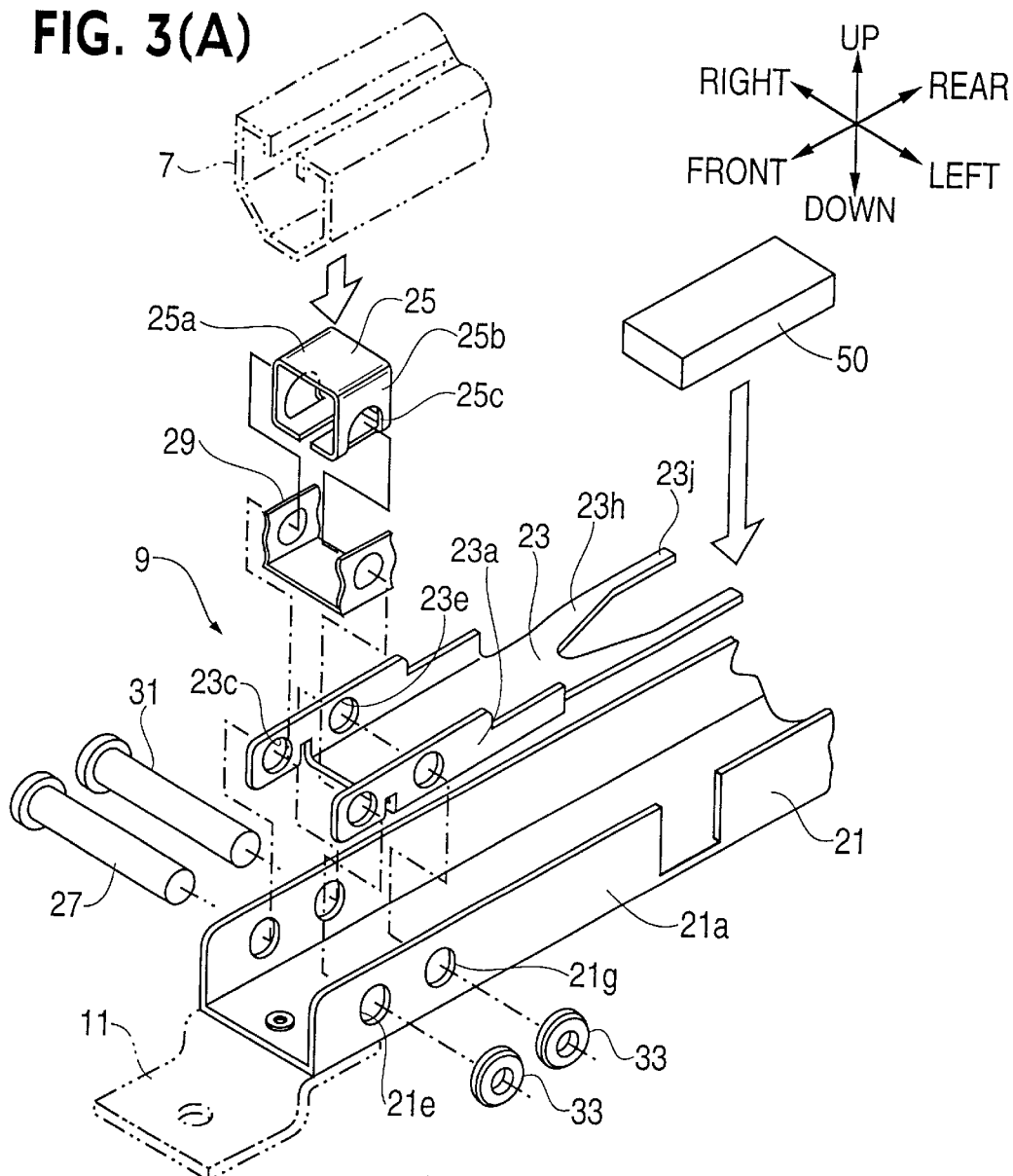
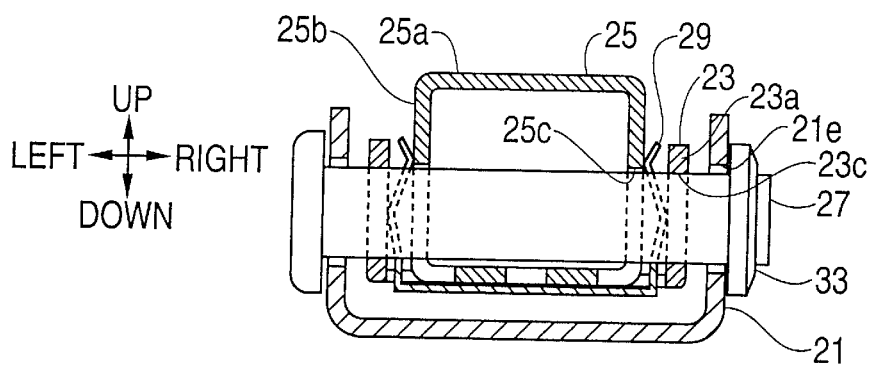

FIG. 4
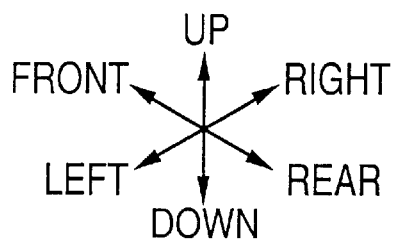
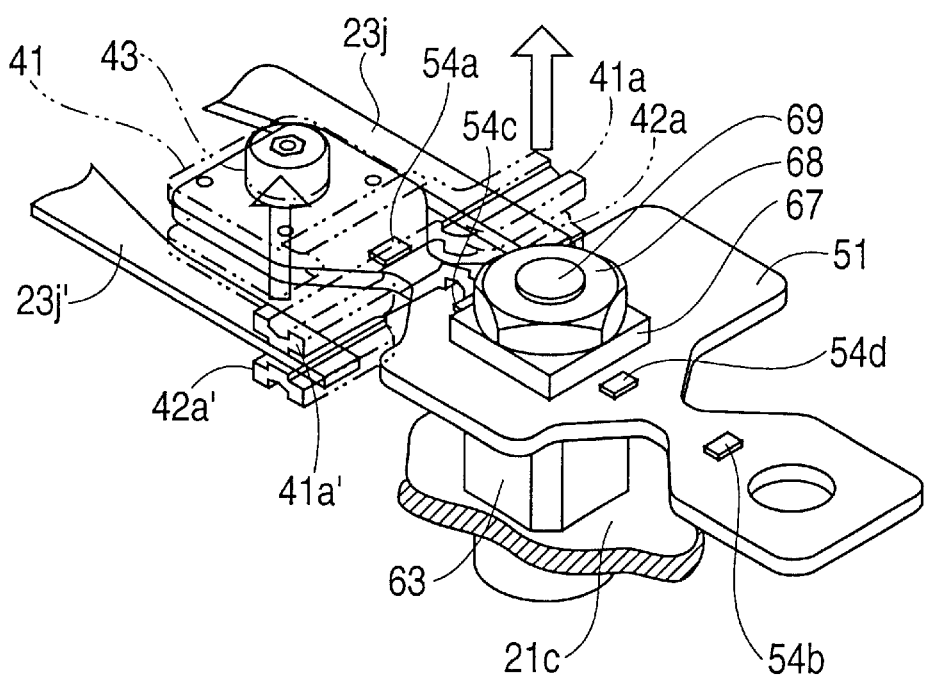

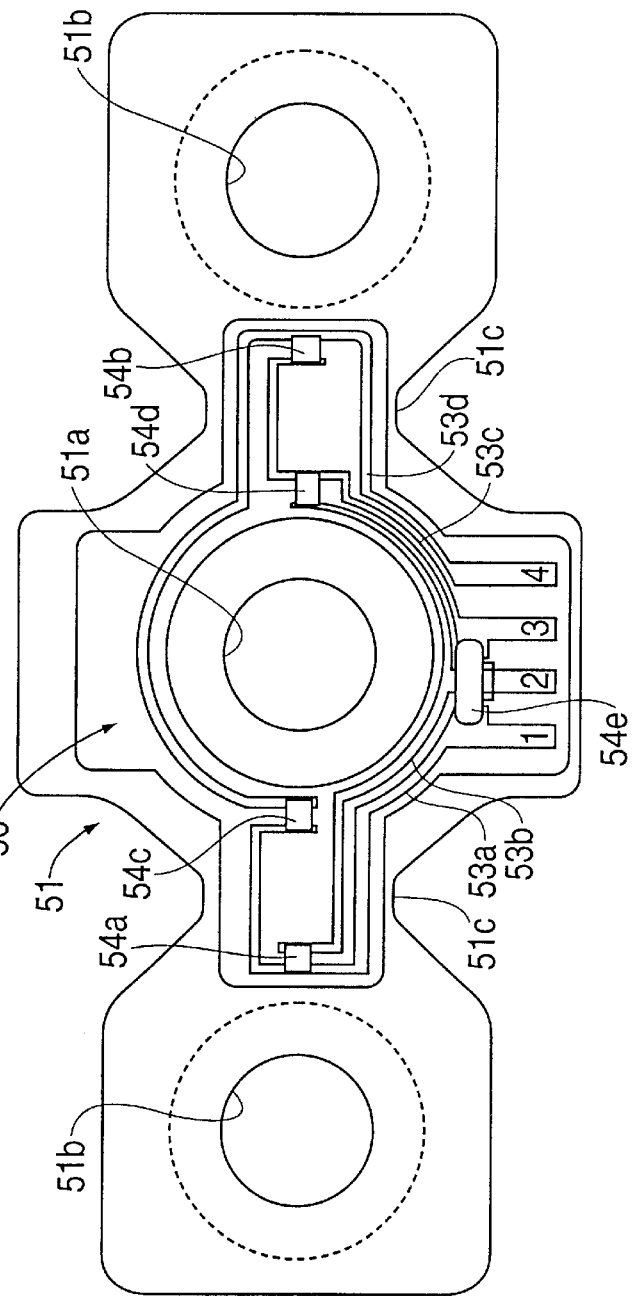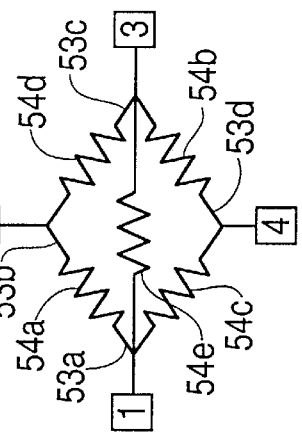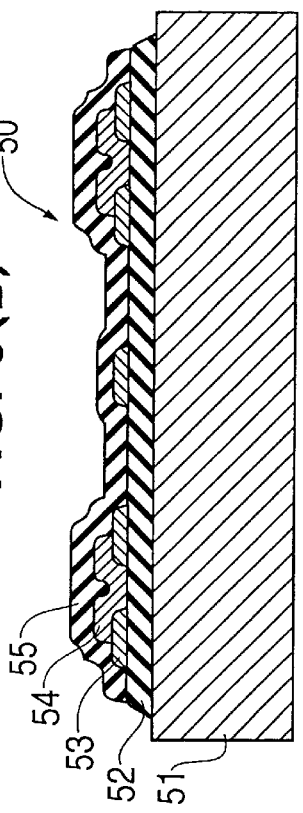

VEHICLE SEAT WEIGHT MEASURING DEVICE

BACKGROUND OF THE INVENTION

1. Field of Invention

The present invention relates to a device for measuring the weight of a vehicle seat including the weight of a person sitting on the vehicle seat. In particular, the present invention relates to a seat weight measuring device which is improved such that the performance of a load sensor is not impaired by dimensional errors, deformation, etc. of the vehicle body and seats.

2. Description of the Related Art

An automobile is equipped with various devices for securing the safety of the driver and passengers, such as seat belts and air bags. The recent trend for further improving the performance of the seat belts and air bags is to control the operation of these safety devices according to the weight (body weight) of the person. For example, the development gas amount and development speed of the air bags are adjusted and the pretension of the seat belt is adjusted in accordance with the weight of the person. For this purpose, it is necessary to determine the weight of the person sitting on the seat. A device for determining a person's weight has been developed. The device includes load sensors (load cells) arranged in the four corners under the seat. The sum total of the vertical loads applied to the load cells is obtained, thereby allowing the seat weight including the weight of the person to be determined (Japanese Patent Applications No. 9-156666, 10-121627, etc. filed by the same applicant).

SUMMARY OF THE INVENTION

According to the present invention a seat weight measuring device for measuring the weight of a vehicle seat including the weight of a person sitting on it is provided. The device includes a load sensor inserted into the seat or between the seat and a vehicle body and adapted to convert at least a part of the seat weight to an electric signal, and an absorption mechanism for absorbing deviation and/or deflection between the seat and the vehicle body. The absorption mechanism is slidable by $L_{IR}$ at the maximum from side to side. The distance $L_{IR}$ may be defined as follow:

$$L_{IR}=(a+b\delta)\times\gamma/(\alpha+\gamma)+(c\delta/2)\times\gamma/(\beta+\gamma)$$

where
- a: dimensional tolerance (mm) of the center with respect to the fore-and-aft direction of right and left seat rails when securing the seat rails to the vehicle body;
- b: maximum stroke (mm) that seat slides are capable of sliding;
- c: distance between fixed points (load sensor center positions) in front of and behind the seat rails;
- δ: sine value (sin θ) of the tolerance θ of the relative angle deviation of the right and left seat rails when securing the seat rails to the vehicle body;
- α: deflection amount (mm/kgf) per unit load when causing a lateral deformation (opening and closing) between the right and left seat slides;
- β: deflection amount (mm/kgf) per unit load when twisting the right and left seat slides laterally and reversely in the longitudinal direction; and
- γ: slide amount (mm/kgf) per unit load when sliding the absorption mechanism.

The present invention also includes a seat weight measuring device for measuring the weight of a vehicle seat including the weight of a person sitting on it, that includes a load sensor inserted into the seat or between the seat and a vehicle body and adapted to convert at least a part of the seat weight to an electric signal, and an absorption mechanism for absorbing deviation and/or deflection between the seat and the vehicle body.

The absorption mechanism may include a pin for connecting the vehicle seat to the vehicle body, the pin passing through a hole. The hole may be sized to provide a clearance about the pin to thereby allow vertical and longitudinal deviation between the vehicle seat and the vehicle body.

Where the vehicle seat includes seat rails attached to a supporting bracket, the absorption mechanism may also include an arm pivotally connected to the vehicle body and including a pair of side plates, the supporting bracket being positioned between the side plates so that a clearance between the bracket and the side plates is provided to thereby allow lateral deviation between the vehicle seat and the vehicle body.

The absorption mechanism may also include a plate spring positioned in the clearance between the bracket and the side plates to thereby center the bracket between the side rails.

BRIEF DESCRIPTION OF THE DRAWINGS

FIG. 1(A) is a schematic bottom view of a seat rail and a seat slide. FIG. 1(B) is a schematic front view of the periphery of legs.

FIGS. 2(A), 2(B), 2(C), and 2(D) are diagrams showing the general construction of a seat weight measuring device according to an embodiment of the present invention. FIG. 2(A) is a plan view, FIG. 2(B) is a side sectional view, and FIGS. 2(C) and 2(D) are front sectional views taken along lines C—C and D—D, respectively, in FIG. 2(B).

FIGS. 3(A) and 3(B) are diagrams showing a deviation/deflection absorbing mechanism of the seat weight measuring device of this embodiment. FIG. 3(A) is an exploded perspective view, and FIG. 3(B) is a front sectional view of a pin bracket portion.

FIG. 4 is a partially cutaway perspective view showing the construction of the periphery of the sensor plate in detail.

FIGS. 5(A), 5(B) and 5(C) are views showing the construction of the sensor plate in detail.

FIG. 6(A) is a plan view, FIG. 6(B) is a side view in the non-load state, and FIG. 6(C) is a side view schematically showing the state in which load is applied.

DETAILED DESCRIPTION OF THE PREFERRED EMBODIMENTS

Figure 1A:
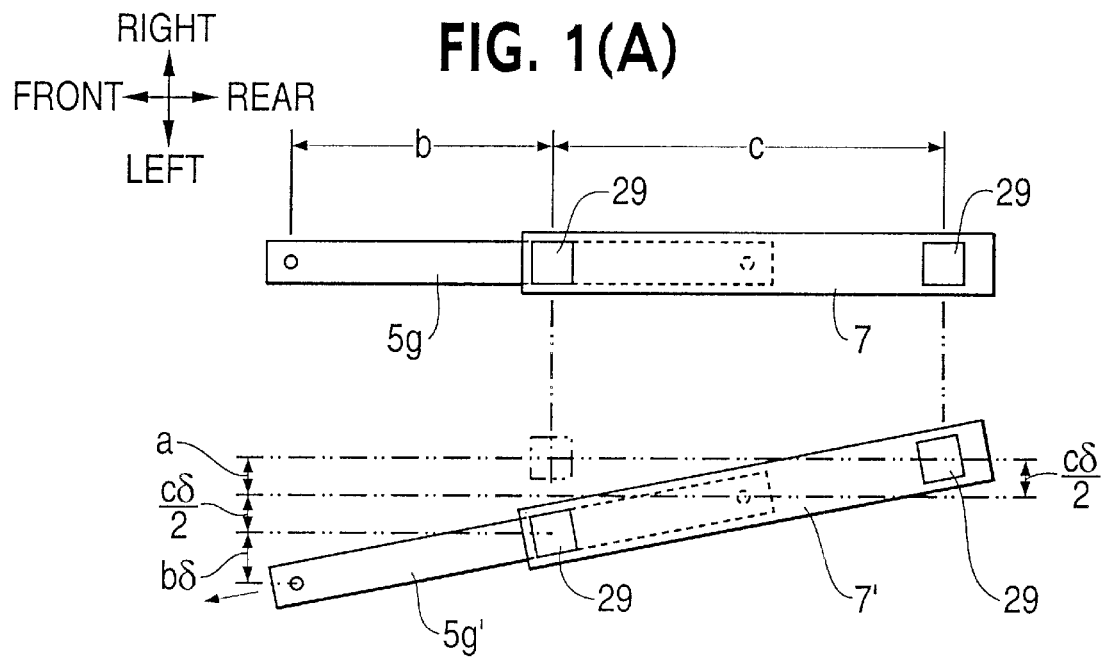
FIGS. 1(A) and 1(B) are diagrams showing the construction of the periphery of the seat legs.

In order to correctly measure the seat weight using the measuring device mentioned in the background above, it is necessary to minimize or eliminate loads other than the weight of the seat and that of the person (or object) on it from being applied to the load cells or sensors. One such load to be avoided is the load generated when the seat weight measuring device is forcibly mounted in the vehicle body and the seat. The load is referred to as the assembly load throughout this application. Assembly loads result from installing the seat weight measuring device in a vehicle body and seat that may include dimensional errors or deformations.

The present invention has been made in view of the above problem. It is an object of the present invention to provide a seat weight measuring device in which the performance of the weight sensor is not impaired by dimensional errors and deformation in the vehicle body and seat.

Accordingly, the present invention includes a seat weight measuring device for measuring the weight of a vehicle seat including the weight of a person sitting on it. The device includes a load sensor inserted into the seat or between the seat and a vehicle body and adapted to convert at least a part of the seat weight to an electric signal; and an absorption mechanism for absorbing deviation and/or deflection between the seat and the vehicle body, wherein the absorption mechanism is slidable by $L_{IR}$ at the maximum from side to side, and wherein $$L_{IR}=(a+b\delta)\times\gamma/(\alpha+\gamma)+(c\delta/2)\times\gamma/(\beta+\gamma).$$

The variables are defined below:
- a: dimensional tolerance (mm) of the center with respect to the fore-and-aft direction of right and left seat rails when securing the seat rails to the vehicle body;
- b: maximum stroke (mm) that seat slides are capable of sliding;
- c: distance between fixed points (load sensor center positions) in front of and behind the seat rails;
- δ: sine value (sin θ) of the tolerance θ of the relative angle deviation of the right and left seat rails when securing the seat rails to the vehicle body;
- α: deflection amount (mm/kgf) per unit load when causing a lateral deformation (opening and closing) between the right and left seat slides;
- β: deflection amount (mm/kgf) per unit load when twisting the right and left seat slides laterally and reversely in the longitudinal direction; and
- γ: slide amount (mm/kgf) per unit load when sliding the absorption mechanism.

In order that the assembly load due to part production errors, dimensional deviation and deflection at the time of mounting, etc. is not transmitted to the load sensor, the absorption mechanism is provided in the joint retaining portion between the load sensor and the seat or between the load sensor and the vehicle body to absorb dimensional errors in the vehicle body and the seat. Thus, a purer measurement load (seat load) is applied to the load sensor, thereby making it possible to correctly measure the seat weight over a wider range.

One of the objects of the seat weight measuring device of the present invention is to measure the weight of the person on the seat. Thus, a device which cancels the weight of the seat to measure exclusively the weight of the person is also included by the seat weight measuring device.

The present invention will now be described with reference to the drawings. First, the construction of a seat and its periphery of an automobile will be described with reference to FIGS. 7(A) and 7(B).

Figure 7A:
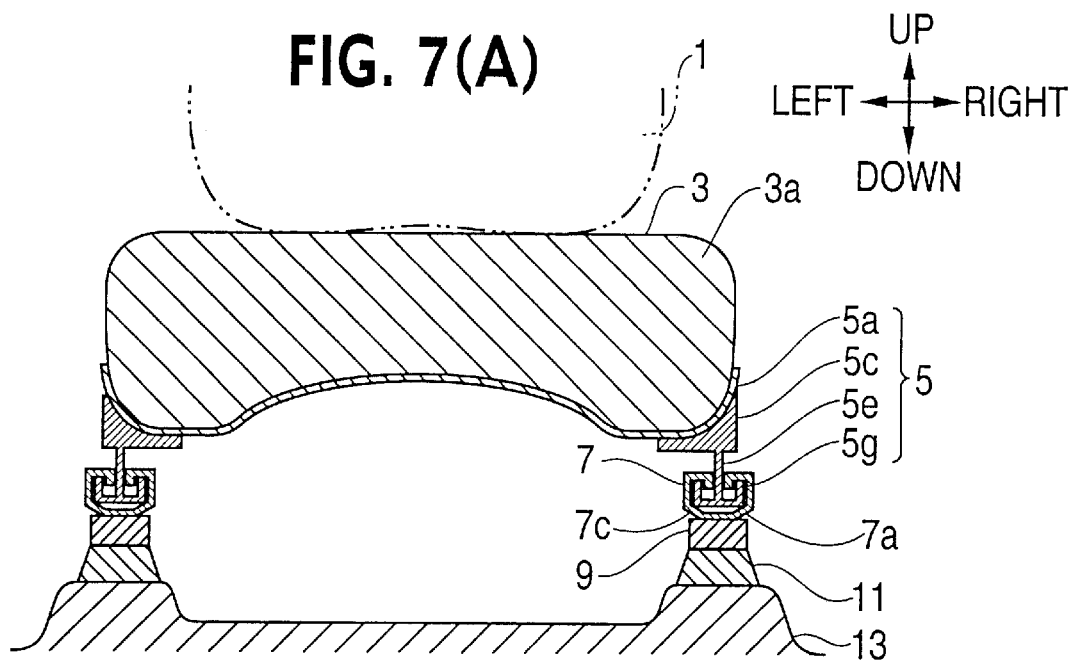
FIG. 7(A) is a front sectional view schematically showing an example of the construction of the portion where the seat is mounted to the vehicle body.
Figure 7B:
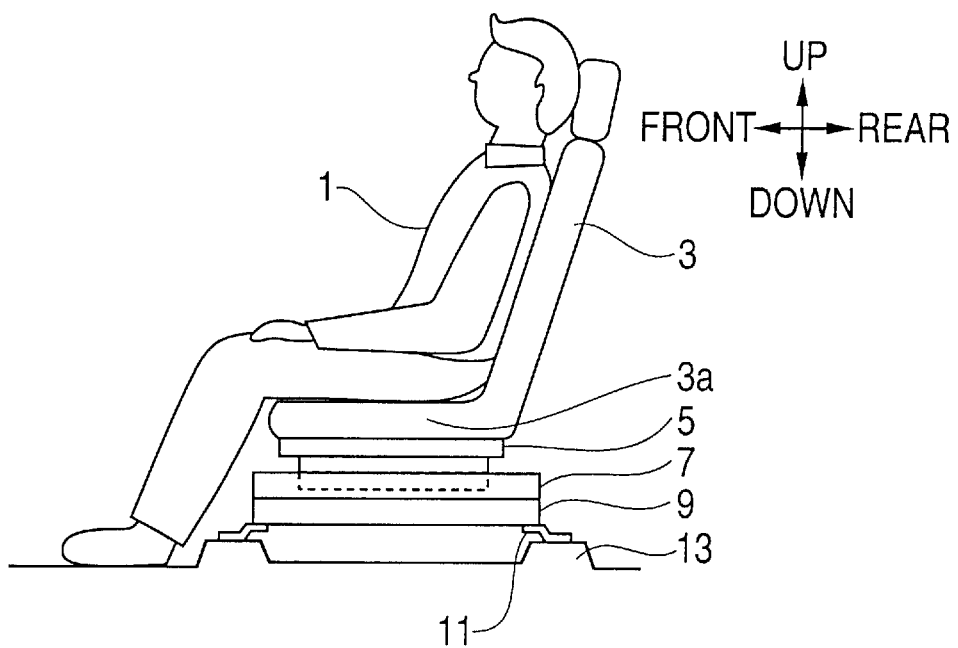
FIG. 7(B) is a side view.

FIG. 7(A) is a schematic front sectional view of a portion where a seat is mounted to a vehicle body. FIG. 7(B) is a side view. In the drawings, the arrows indicate the following directions. Up: gravitationally upward direction when the vehicle body is horizontal, down: gravitationally downward direction when the vehicle body is horizontal, front: vehicle advancing direction, rear: vehicle retreating direction, left: the left-hand side with respect to the vehicle advancing direction, right: right-hand side with respect to the vehicle advancing direction.

FIG. 7(B) shows a seat 3. A person 1 sits on a seat cushion 3a of the seat 3. The lower side of the seat cushion 3a is supported by a seat frame 5 formed of a steel plate. The seat frame 5 includes a bottom plate 5a, lateral plate 5c, longitudinal plate 5e, slide plate 5g, etc. The bottom plate 5a expands in order to cover the lower surface of the seat cushion 3a. The lateral plate 5c extends laterally along the lower surface of the bottom plate 5a. The longitudinal plate 5e extends vertically downward from the central portion of the lateral plate 5c. The slide plate 5g protrudes in a feather-like fashion to the right and left from the longitudinal plate 5e. Further, its forward end portion is upwardly bent. The slide plate 5g is also referred to as a seat slide.

Two seat rails 7 are provided parallel to each other under the right and left portions of the seat 3, the rails 7 extend longitudinally. The seat rails 7 have a U-shaped sectional configuration, and recesses 7c exist inside. The upper openings of the recesses 7c constitute grooves 7a extending longitudinally. The longitudinal plates 5e of the seat frame 5 are in the grooves 7a.

The slide plates 5g of the seat frames 5 are positioned in the recesses 7c of the seat rails 7. The slide plates 5g are longitudinally slidable in the seat rails 7.

A seat weight measuring device 9 is connected to the lower side of each seat rail 7. The seat weight measuring device is in the form of a thin and narrow box extending longitudinally. The seat weight measuring device 9 will be described in detail below.

Seat brackets 11 are mounted to the front and rear end portions of the lower surface of the seat weight measuring device 9. The seat brackets 11 are secured to a seat mounting portion 13 of the vehicle body by bolts or the like.

FIGS. 2(A), 2(B) and 2(C) are diagrams showing the general construction of a seat weight measuring device according to an embodiment of the present invention. FIG. 2(A) is a plan view, FIG. 2(B) is a side sectional view, and FIGS. 2(C) and 2(D) are front sectional views.

FIGS. 3(A) and 3(B) depict a deviation/deflection absorption mechanism of the seat weight measuring device of this embodiment. FIG. 3(A) is an exploded perspective view, and FIG. 3(B) is a front sectional view of the pin bracket portion.

In FIGS. 2(A) and 2(B) and FIG. 3(A), a substantial portion of the rear half is omitted.

FIG. 4 is a partially cutaway perspective view showing the construction of the periphery of the sensor plate in detail.

FIGS. 5(A), 5(B), and 5(C) are diagrams showing an example of the construction of the sensor plate of a seat weight measuring device according to an embodiment of the present invention. FIG. 5(A) is a plan view of a sensor plate, FIG. 5(B) is a side sectional view of FIG. 5(A), and FIG. 5(C) is a sensor circuit diagram.

Figure 6A:
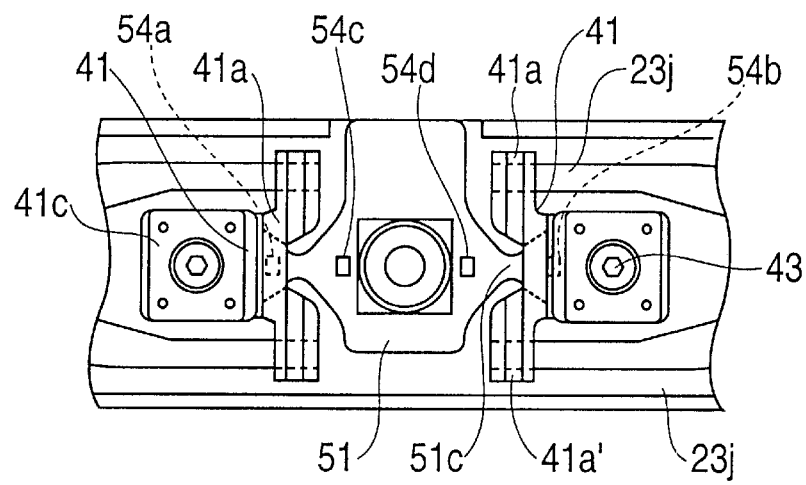
FIGS. 6(A), 6(B) and 6(C) are diagrams showing the relationship between the sensor plate and half arms.
Figure 6B:
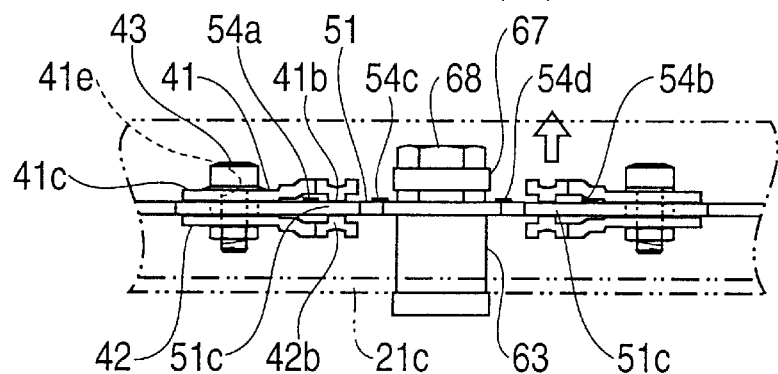
Figure 6C:
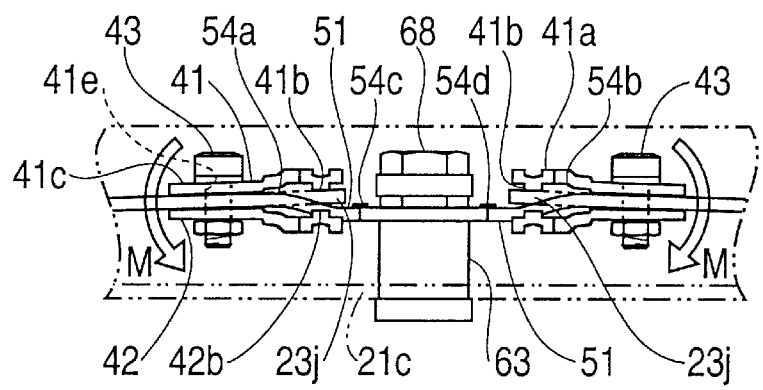

FIGS. 6(A), 6(B) and 6(C) are diagrams showing the relationship between the sensor plate and a half arm. FIG. 6(A) is a plan view, FIG. 6(B) is a side view showing a non-load condition, and FIG. 6(C) is a schematic side view showing a condition in which load is applied.

The seat weight measuring device 9 has a thin and narrow base 21 as a base body. Mounted to the vehicle body, the base 21 extends longitudinally. As shown in FIGS. 2(C) and 2(D), the base 21 is a steel-plate product having a U-shaped sectional configuration. The bottom portion of the base 21 is referred to as bottom plate 21c, and portions raised and bent by 90 degrees at the right and left ends of the bottom plate 21c are referred to as slide plates 21a.

The base side plates 21a have two front and rear pin holes 21e and 21g (See FIGS. 2(A), 2(C) and 2(D)). The holes 21e and 21g are opposed to the right and left side plates 21a and 21a'.

The holes 21e located nearer to the end of the base 21 are provided at a position at a distance corresponding to approximately ⅛ of the total length of the base 21 from the end thereof. As shown in FIG. 3(A), the holes 21e are vertically elongated holes. The end portion of a bracket pin 27 is inserted into the elongated holes 21e.

However, there are vertical and horizontal gaps between the bracket pin 27 and the elongated holes 21e, and the bracket pin 27 usually does not come into contact with the inner edges of the elongated holes 21e. However, when an excessively large load is applied to this seat weight measuring device 9 (specifically, the pin bracket 25 portion), the bracket pin 27 is lowered to abut the lower edge of the elongated holes 21e, and the excessively large load is not transmitted to a load sensor (sensor plate 51 described in detail below). That is, the pin 27 and the elongated holes 21e constitute a part of a mechanism for restricting the upper limit of the load applied to the sensor plate 51. The main function of the bracket pin 27 is to transmit the seat weight applied to the pin bracket 25 to a Z-arm 23.

Pin holes 21g are formed at a position somewhat nearer to the center than the elongated holes 21e (at a position nearer to the center by a distance corresponding to approximately 1/10 of the total length of the base 21). A base pin 31 is inserted into the holes 21g. As shown in FIG. 2(D), the base pin 31 exists so as to bridge the interval between the right and left base side plates 21a and 21a'. A retainer 33 is attached to the end portion of the pin 31, and the base pin 31 is secured to the base 21. The base pin 31 serves as the rotation shaft of the Z-arm 23.

The Z-arm 23 is arranged inside the base 21. In plan view, the portion of the Z-arm 23 is nearer to the center is forked (forked portion 23h), and the portion nearer to the end is rectangular (bottom portion 23f). At the right and left ends of the half portion of the Z-arm 23 nearer to the end, there are formed side plates 23a by upwardly bending by 90 degrees. The forked portion is a flat plate. The side plates 23a extend along the inner side of the side plates 21a of the base 21. There are gaps between the side plates 23a and 21a.

The Z-arm side plates 23a also have two pin holes 23c and 23e. The bracket pin 27 is passed through the pin holes 23c nearer to the end. The base pin 31 is passed through the pin holes 23e nearer to the center. The base pin 31 is the rotation center of the Z-arm 23. The pin holes 23e and the base pin 31 are in sliding contact to allow rotation of the Z-arm 23. As shown in FIG. 2(D), disc-like spacers 35 are fitted onto the outer periphery of the base pin 31 between the base side plates 21a and the Z-arm side plates 23a.

The length of the forked portion 23h of the Z-arm 23 is approximately half the total length of the Z-arm 23. The portion 23h is branched off to the right and left and extends longitudinally nearer to the center, where its width is relatively small. As shown in FIG. 4, operating portions 23j at the forward end of the forked portion are between feather portions 41a and 42a of upper and lower half arms 41 and 42.

When a load is applied to the pin bracket 25, the Z-arm 23 rotates slightly (5 degrees at the maximum), and the operating portions 23j transmit the load to the sensor plate 51 through the half arms 41 and 42.

As shown in FIG. 3, the pin bracket 25 has a substantially U-shaped sectional configuration. The longitudinal length of the pin bracket is not large; it is approximately 1/20 of the length of the base 21. The upper surface 25a of the pin bracket 25 is flat, and the seat rails 7 shown in FIG. 7 are positioned on the surface 25a. The rails 7 and bracket are firmly joined together by means of bolts or the like.

The right and left side plates 25b of the pin bracket 25 extend vertically downward on the right and left sides of the bracket 25, and their lower end portions are inwardly bent. The side plates 25b are arranged on the inner side of the Z-arm side plates 23a with some play or clearance therebetween. The side plates 25b have pin holes 25c. The bracket pin 27 is passed through the holes 25c. The diameter of the pin holes 25c is larger than the diameter of the bracket pin 27. Due to the gap therebetween, dimensional errors in the seat and vehicle body and unexpected deformation thereof are absorbed.

A spring plate 29 is placed between the right and left side plates 25b of the pin bracket 25 and the right and left Z-arm side plates 23a. The spring plate 29 has spring-washer-like portions with holes and is fitted on the outer side of the bracket pin 27 with a gap. This spring plate 29 constitutes a centering mechanism for biasing the pin bracket 25 toward the center.

This centering mechanism functions to force the pin bracket to be positioned near the center of the slidable range. Due to the operation of this centering mechanism, it is possible to secure the movable range for the slide mechanism and rotation mechanism in all directions (laterally, vertically and longitudinally) after the mounting of the seat weight measuring device.

Next, the construction of the sensor plate 51 and its periphery will be described.

First, the construction of the sensor plate 51 will be described.

FIGS. 5(A), 5(B), and 5(C) are diagrams showing an example of the construction of the sensor plate of a seat weight measuring device according to an embodiment of the present invention. FIG. 5(A) is a plan view of a sensor plate, FIG. 5(B) is a side sectional view of FIG. 5(A), and FIG. 5(C) is a sensor circuit diagram.

An insulating layer (lower insulating layer) 52 for electrical insulation is formed on a sensor plate (spring material) 51 which is the base material of the sensor 50. A wiring layer 53 is selectively formed on this insulating layer 52. Further, on this wiring layer 53, a resistor layer 54 is selectively formed to constitute a strain gage. And, an insulating layer (upper insulating layer) 55 serving as their protective layer is formed. In this way, electric circuits such as a resistor are directly formed in lamination on the spring material 51, so that it is possible to reduce the machining cost and the mounting cost, and further, to achieve an improvement in heat resistance and corrosion resistance.

The sensor plate 51 is generally a rectangular plate having two constrictions. At the center of the sensor plate 51, there is provided a central shaft hole 51a. At both ends of the sensor plate 51, there are provided bolt holes 51b. From the periphery of the central shaft hole 51a, the sensor 50 is formed over the intervals between the central shaft hole 51 and the bolt holes 51b. Of the formation region of the load sensor 50, in the regions 51c between the central shaft hole 51a and the bolt holes 51b, there are formed on both sides V-shaped constrictions. Due to these constrictions, the portion of the sensor plate 51 which is deformed is fixed in position, so that the positional change in the surface strain of the sensor 50 is fixed, thereby stabilizing the sensitivity.

The sensor 50 is arranged substantially symmetrical with respect to the center of the central shaft hole 51a. The sensor 50 is formed by four strain resistors. Near the bolt holes 51b (near the ends), there are arranged two strain resistors 54a and 54b on the tensile strain side, and, near the central shaft hole 51a (near the center), there are arranged two strain resistors 54c and 54d on the compressive strain side. And, the four strain resistors 54a, 54b, 54c and 54d are connected by wirings 53a, 53b, 53c and 53d so as to form a bridge circuit as shown in FIG. 5(C). The boxes numbered 1, 2, 3 and 4 in FIG. 5(C) represent terminals.

Arranged between the strains resistors 54a, 54c and the strain resistors 54b and 54d is a sensitivity adjusting resistor 54e.

In addition to detecting strain in the sensor plate 51 by the strain resistors 54a, 54b, 54c and 54d, it is also possible to detect deflection of the sensor plate 51 by a capacitance sensor, hole element, etc., that converts the deflection into load.

As shown in FIGS. 4, 6(A), 6(B) and 6(C), at the center of the base bottom plate 21c, the sensor plate 51 is firmly fixed to a column 63 by means of a washer 67, a nut 68 and a fastener 69.

As shown in FIGS. 4, 6(A), 6(B) and 6(C), the half arms 41 and 42 are composed of four plates on the front and rear and the upper and lower sides, which are incorporated such that the front and rear portions of the sensor plate 51 are placed therebetween. The half arms 41 and 42 are generally of the same configuration, thus only the upper half arm 41 will be described.

The half arm main body portion 41c consists of a rectangular plate having a mounting hole 41e (FIG. 6(B)) at its center for receiving fastener 43. In the edge portion of the main body portion 41c nearer to the center, there are provided feather portions 41a extending to the right and left. On the back side of the feather portions 41a, there is formed a bank-like fulcrum 41b extending to the right and left. The forward end portion of the fulcrum 41b consists of a somewhat pointed ridge.

Next, the arrangement of the upper and lower half arm 41 and 42, the sensor plate 51, and the Z-arm operating portion 23j will be described.

The lower surface of the main body portion 41c of the upper half arm 41 is a flat surface, which is closely secured to the surface of the sensor plate 51. The feather portions 41a and 42a of the upper and lower half arm 41 and 42 are opposed to each other, with the fulcrums 41b and 42b being opposed to each other. Between the fulcrums 41b and 42b, there is arranged the operating portion 23j of the Z-arm 23.

When a load is applied to the pin bracket 25 of the seat weight measuring device 9, the Z-arm 23 slightly rotates and the operating portion 23j thereof is raised upwardly. FIG. 6(C) is a schematic view showing an exaggerated view of the sensor plate and the half arms when this occurs.

When the Z-arm operating portion 23j is raised, the fulcrum 41b of the upper half arm 41 is raised. As a result, a moment M is applied to the longitudinal end of the sensor plate 51. Due to this moment M, the strain gages 54a and 54b at the longitudinal ends are pulled, and the strain gages 54c and 54d in the middle are compressed. The resulting changes in the resistance of the strain gages are extracted as electric signals to measure the strain of the sensor plate and the load applied to the pin bracket 25.

Next, the whole deviation/deflection absorbing mechanism of the seat weight measuring device of this embodiment will be described in a summarized form.

FIGS. 3(A) and 3(B) are diagrams showing the deviation/deflection absorbing mechanism of the seat weight measuring device of this embodiment. FIG. 3(A) is an exploded perspective view, and FIG. 3(B) is a front sectional view of the pin bracket portion. The pin bracket 25 is firmly secured to the seat rails 7 by means of bolts or the like. Each portion of the seat weight measuring device 9 has the construction and assembly relationship as described above.

With respect to the vertical direction of the vehicle body, deviation is absorbed by the gap or clearance between the pin holes 25c of the pin bracket 25 and the bracket pin 27.

With respect to the longitudinal direction of the vehicle body, deviation is absorbed by the elongated pin holes 25c of the pin bracket 25.

With respect to the lateral direction of the vehicle body, deviation is absorbed by the gaps or clearances between the pin bracket side plates 25b and the Z-arm side plates 23a. In this portion, there is provided the centering mechanism using the plate spring 29. Its quantitative construction will be described below.

With respect to the rotation around a vertical axis of the vehicle body, deviation is mainly absorbed by the gaps between the pin bracket side plates 25b and the Z-arm side plates 23a.

With respect to the rotation around a longitudinal axis of the vehicle body, deviation is mainly absorbed by the gaps between the pin bracket side plates 25b and the Z-arm side plates 23a as in the case of the rotation around the vertical axis of the vehicle body.

With respect to the rotation around a lateral axis of the vehicle body, deviation is mainly absorbed by the rotation of the pin bracket 25 around the bracket pin 27.

Next, the amount by which the absorbing mechanism can slide in the lateral direction will be considered quantitatively.

Figure 1B:
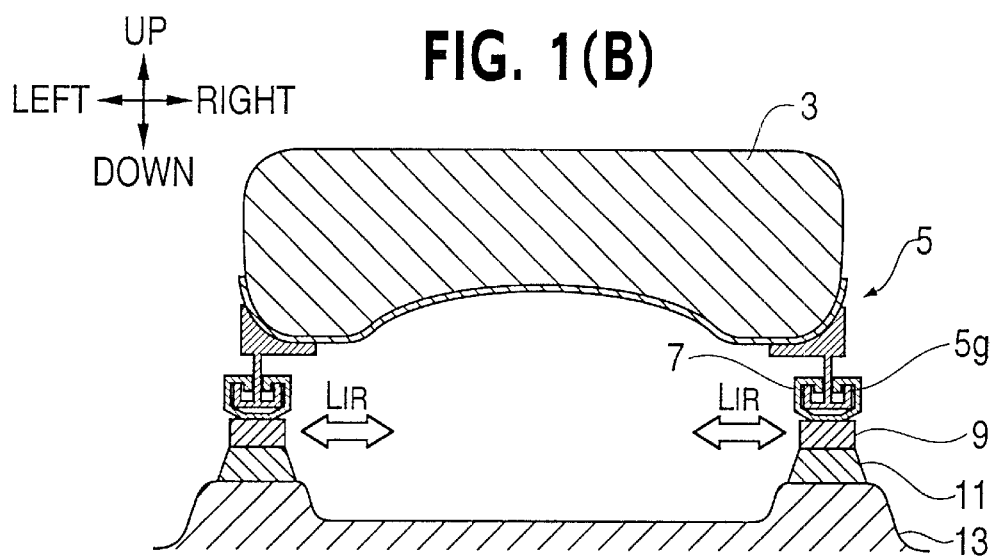

FIGS. 1(A) and 1(B) are diagrams showing the construction of the periphery of the leg portion of the seat. FIG. 1(A) is a schematic bottom view of the seat rail and the seat slide. FIG. 1(B) is a schematic front view of the periphery of the seat leg portion.

As shown in FIG. 1(B), the seat 3 is supported by a seat frame 5. In the lower portion of the seat frame 5, there are provided right and left seat slides 5g, which extend in the longitudinal direction of the vehicle. The seat slides 5g are longitudinally slidable in the seat rails 7. Below the seat rails 7, there is provided the seat weight measuring device 9 including the above-described absorbing mechanism. The seat weight measuring device 9 is secured to the seat mounting portion 13 of the vehicle body through the seat bracket 11.

As shown in FIG. 1(A), the seat slides 5g can protrude longitudinally from the seat rails 7 by a certain length b.

At the front and rear ends, the seat rails are connected to the pin brackets 29 of the seat weight measuring device. The distance between the central points of the front and rear pin brackets 29 (the length of the seat rails) is c. The length by which the seat slides 5g protrude from the seat rails 7 (the maximum stroke through which sliding is possible) is b. The small circles at the front and rear ends of the seat slides 5g represent the positions of the connecting portions of the seat frame 5 and the seat slides 5g.

In the state shown in FIG. 1(A), there is a dimensional deviation (tolerance) a in the distance between the longitudinal centers of the right and left seat rails 7. Further, the left-hand seat rail 7' is longitudinally inclined by an angle θ. As a result, at the front and rear ends of the seat rail 7', there is a positional deviation $(c/2) \times \sin θ = cδ/2$. Further, the front end of the seat slide 5g' is deviated by $b \times \sin θ = bδ$. If there is no absorbing mechanism when there are these deviation, the seat frame 5 or the vehicle body mounting portion 13 are forcibly deformed to generate internal stress (assembly stress), and there is disturbance in the measurement value of the seat weight measuring device.

In view of this, it is necessary to provide a mechanism absorbing the force generated after the mounting of the seat so that the measurement made by the weight sensor is not affected.

The stroke that the absorbing mechanism can absorb is $L_{IR}=\gamma Fs$.

Since the relative horizontal deviation $(a+b\delta)$ in the lateral direction at the time of mounting the seat is mitigated and balanced by the action of the absorbing mechanism, the force acting on the absorbing mechanism is as follows:

$$Fs=(a+b\delta-\gamma Fs)/\alpha$$

In the balanced state, $Fs=(a+b\delta)/(a+\gamma)$.
Thus, the stroke $L_{IR}=\gamma(a+b\delta)/(\alpha+\gamma)$.

Since the relative distortional deviation $(c\delta/2\beta)$ in the lateral direction when fastening the seat is mitigated and balanced by the action of the absorbing mechanism, the force acting on the absorbing mechanism is as follows:

$$Fs=(c\delta/2-\gamma Fs)\beta$$

In the balanced state, $Fs=c\delta/2(\beta+\gamma)$, and the stroke $L_{IR}=\gamma c\delta/2(\beta+\gamma)$.

From this, the horizontal deviation and the distortional deviation are synthesized to obtain the worst case as follows:

The force acting on the absorbing mechanism $Fs=(a+b\delta)/(\alpha+\gamma)+c\delta/2(\beta+\gamma)$.

The stroke $L_{IR}=\gamma((a+b\delta)/(\alpha+\gamma)+c\delta/2(\beta+\gamma))$.

From the stroke equation, when the absorbing mechanism is freely allowed to slide, $\gamma$ is variable, and the seat deformation is the stroke absorbed by the absorbing mechanism.

The stroke $L_{IR}=\gamma(a+b\delta+c\delta/2)$.

Generally speaking, this stroke is over 10 mm, and is not practical for the absorbing mechanism.

Constructionally, a light-weight seat opening to the right and left is more likely to cause deformation than distortion. That is, $\alpha>>\beta$. Thus, if there is positional deviation in the seat mounting portion, the seat legs open (or inwardly close) to absorb the deviation. However, distortional deformation does not easily occur, and large stress is generated in the load sensor. In this case, when the $\gamma$ of the absorbing mechanism is in the range: $\alpha>>\gamma>\beta$, the deviation in the horizontal direction is absorbed through seat deformation, and the distortion is absorbed by the absorbing mechanism.

In a power seat, the seat frame is firm, and $\gamma>>\alpha=\beta$, so that the deviation is absorbed by the absorbing mechanism. In any case, the deviation is dispersed in the seat and the absorbing mechanism in a well-balanced manner to suppress the stress to a level where the measurement is not affected.

As is apparent from the above description, in accordance with the present invention, in order that part production errors, dimensional deviations in mounting, and assembly load due to deflection or the like may not be transmitted to the load sensor, the above-described absorbing mechanism is provided in a joint retaining portion between the load sensor and the seat or between the load sensor and the vehicle body to absorb dimensional errors in the vehicle and the seat, whereby a purer measurement load (seat weight) is applied to the load sensor, thereby making it possible to perform correct measurement sufficiently utilizing the effective range of the sensor.

Priority application JP H11-212212, filed Jul. 27, 1999, is incorporated herein by reference in its entirety.

We claim:

1. A seat weight measuring device for measuring the weight of a vehicle seat including the weight of a person sitting on it, comprising:

a load sensor adapted to convert at least a part of the seat weight to an electric signal; and an absorption mechanism for absorbing at least one of deviation and deflection between the seat and a vehicle body, wherein the absorption mechanism is slidable by $L_{IR}$ at the maximum from side to side, and wherein $$L_{IR}=(a+b\delta)\times\gamma/(\alpha+\gamma)+(c\delta/2)\times\gamma/(\beta+\gamma)$$

where a: dimensional tolerance (mm) of the center with respect to the fore-and-aft direction of right and left seat rails when securing the seat rails to the vehicle body;

b: maximum stroke (mm) that seat slides are capable of sliding;

c: distance between fixed points (load sensor center positions) in front of and behind the seat rails;

$\delta$: sine value ($\sin\theta$) of the tolerance $\theta$ of the relative angle deviation of the right and left seat rails when securing the seat rails to the vehicle body;

$\alpha$: deflection amount (mm/kgf) per unit load when causing a lateral deformation (opening and closing) between the right and left seat slides;

$\beta$: deflection amount (mm/kgf) per unit load when twisting the right and left seat slides laterally and reversely in the longitudinal direction; and $\gamma$: slide amount (mm/kgf) per unit load when sliding the absorption mechanism.

2. The seat weight measuring device of claim 1, wherein the absorption mechanism includes a pin passing through a hole and connecting the vehicle seat to the vehicle body;

wherein the hole is sized to provide a first clearance about the pin to thereby allow at least one of vertical and longitudinal deviation between the vehicle seat and the vehicle body;

wherein the vehicle seat includes seat rails attached to a supporting bracket; and wherein the absorption mechanism includes an arm pivotally connected to the vehicle body, and a pair of side plates, the supporting bracket being positioned between the side plates so that a second clearance between the bracket and the side plates is provided to thereby allow lateral deviation between the vehicle seat and the vehicle body;

the seat weight measuring device further comprising a spring positioned in the second clearance to thereby center the bracket between the side rails.

3. A seat weight measuring device for measuring the weight of a vehicle seat including the weight of a person sitting on it, comprising:

a load sensor adapted to convert at least a part of the seat weight to an electric signal; and an absorption mechanism for absorbing at least one of deviation and deflection between the seat and a vehicle body, wherein the absorption mechanism includes a pin passing through a hole and connecting the vehicle seat to the vehicle body, and wherein the hole is sized to provide a first clearance about the pin to thereby allow at least one of vertical and longitudinal deviation between the vehicle seat and the vehicle body.

4. The seat weight measuring device of claim 3, wherein the vehicle seat includes seat rails attached to a supporting bracket; and wherein the absorption mechanism includes an arm pivotally connected to the vehicle body, and a pair of side plates, the supporting bracket being positioned between the side plates so that a second clearance between the bracket and the side plates is provided to thereby allow lateral deviation between the vehicle seat and the vehicle body.

5. The seat weight measuring device of claim 4, further comprising a spring positioned in the second clearance to thereby center the bracket between the side rails.

6. A method of measuring the weight of a vehicle seat including a portion of the weight of a person sitting on it, comprising the steps of:

converting at least a portion of the vehicle seat weight to an electric signal; and absorbing at least one of deviation and deflection between the vehicle seat and a vehicle body by an absorption mechanism slidable in a direction $L_{IR}$, wherein $$L_{IR}=(a+b\delta)\times\gamma/(\alpha+\gamma)+(c\delta/2)\times\gamma/(\beta+\gamma)$$

and where a: dimensional tolerance (mm) of the center with respect to the fore-and-aft direction of right and left seat rails when securing the seat rails to the vehicle body;

b: maximum stroke (mm) that seat slides are capable of sliding;

c: distance between fixed points (load sensor center positions) in front of and behind the seat rails;

δ: sine value (sin θ) of the tolerance θ of the relative angle deviation of the right and left seat rails when securing the seat rails to the vehicle body;

α: deflection amount (mm/kgf) per unit load when causing a lateral deformation (opening and closing) between the right and left seat slides;

β: deflection amount (mm/kgf) per unit load when twisting the right and left seat slides laterally and reversely in the longitudinal direction; and γ: slide amount (mm/kgf) per unit load when sliding the absorption mechanism.

7. The method of claim 6, wherein the step of absorbing is performed by an absorption mechanism which includes a pin passing through a hole and connecting the vehicle seat to the vehicle body;

wherein the hole is sized to provide a clearance about the pin to thereby allow at least one of vertical and longitudinal deviation between the vehicle seat and the vehicle body;

wherein the vehicle seat includes seat rails attached to a supporting bracket; and wherein the absorption mechanism includes an arm pivotally connected to the vehicle body, and a pair of side plates, the supporting bracket being positioned between the side plates so that a second clearance between the bracket and the side plates is provided to thereby allow lateral deviation between the vehicle seat and the vehicle body;

the seat weight measuring device further comprising a spring positioned in the second clearance to thereby center the bracket between the side rails.

8. A method of measuring the weight of a vehicle seat including a portion of the weight of a person sitting on it, comprising the steps of:

converting at least a portion of the vehicle seat weight to an electric signal; and absorbing at least one of deviation and deflection between the vehicle seat and a vehicle body by an absorption mechanism which includes a pin passing through a hole and connecting the vehicle seat to the vehicle body; and wherein the hole is sized to provide a clearance about the pin to thereby allow at least one of vertical and longitudinal deviation between the vehicle seat and the vehicle body.

9. The method of claim 8, wherein the vehicle seat includes seat rails attached to a supporting bracket; and wherein the step of absorbing at least one of deviation and deflection is performed by an absorption mechanism which includes an arm pivotally connected to the vehicle body, and a pair of side plates, the supporting bracket being positioned between the side plates so that a second clearance between the bracket and the side plates is provided to thereby allow lateral deviation between the vehicle seat and the vehicle body.

10. The method of claim 9, wherein the step of absorbing is performed by an absorption mechanism, further comprising a spring positioned in the second clearance to thereby center the bracket between the side rails.

* * * * *